United States Patent [19]

Hait

[11] Patent Number: 5,770,854

[45] Date of Patent: Jun. 23, 1998

[54] PATTERN-RECOGNITION COMPUTING AND METHOD FOR PRODUCING SAME

[75] Inventor: John N. Hait, Missoula, Mont.

[73] Assignee: Rocky Mountain Research Center, Missoula, Mont.

[21] Appl. No.: 532,329

[22] Filed: Sep. 19, 1995

Related U.S. Application Data

[63] Continuation-in-part of Ser. No. 357,460, Dec. 16, 1994, Pat. No. 5,623,366, and a continuation-in-part of Ser. No. 454,070, May 30, 1995, Pat. No. 5,617,249, which is a continuation-in-part of Ser. No. 357,460, Dec. 16, 1994, Pat. No. 5,623,366.

[51] Int. Cl.[6] ............................... G06G 7/00; G06E 1/04
[52] U.S. Cl. ........................ 250/216; 359/108; 359/577; 364/713; 364/807; 382/181; 382/210
[58] Field of Search ........................ 250/216; 359/107, 359/108, 577; 364/713, 807, 822, 826, 837; 382/181, 191, 210, 211

[56] References Cited

U.S. PATENT DOCUMENTS

| | | | |
|---|---|---|---|
| 5,093,802 | 3/1992 | Hait | 364/807 |
| 5,175,775 | 12/1992 | Iwaki et al. | 382/31 |
| 5,216,541 | 6/1993 | Takesue et al. | 359/561 |
| 5,239,173 | 8/1993 | Yang | 250/214 LS |
| 5,274,716 | 12/1993 | Mitsuoka et al. | 382/31 |
| 5,369,511 | 11/1994 | Amos | 359/15 |
| 5,466,925 | 11/1995 | Hait | 250/216 |
| 5,528,702 | 6/1996 | Mitsuoka et al. | 382/211 |
| 5,617,249 | 4/1997 | Hait | 359/577 |
| 5,619,596 | 4/1997 | Iwaki et al. | 382/278 |
| 5,623,366 | 4/1997 | Hait | 250/216 |

*Primary Examiner*—David C. Nelms
*Assistant Examiner*—John R. Lee
*Attorney, Agent, or Firm*—Leonard D. Schappert

[57] ABSTRACT

Pattern-recognition computing can be accomplished using wave-type or other types pf energy. In pattern-recognition computing which uses a plurality of wave-type energy input patterns modulated with quantized information, energy from the patterns combines to produce interference-based dynamic images. Component parts of a dynamic image are separated and recombined to produce logic and other computing process outputs. To produce a coordinated set of optics for pattern-recognition computing, waveforms at pixel-sized image components of the dynamic image are chosen to become contributors to the combined output if they will contribute (or can be modified to contribute) in a positive manner to a combined output waveform that obeys the logic rules of the device being produced. Iterative changes in input pattern characteristics are used to optimize the coordinated optics. Pattern-recognition computing can also use special interference and frequency-multiplexed logic.

8 Claims, 6 Drawing Sheets

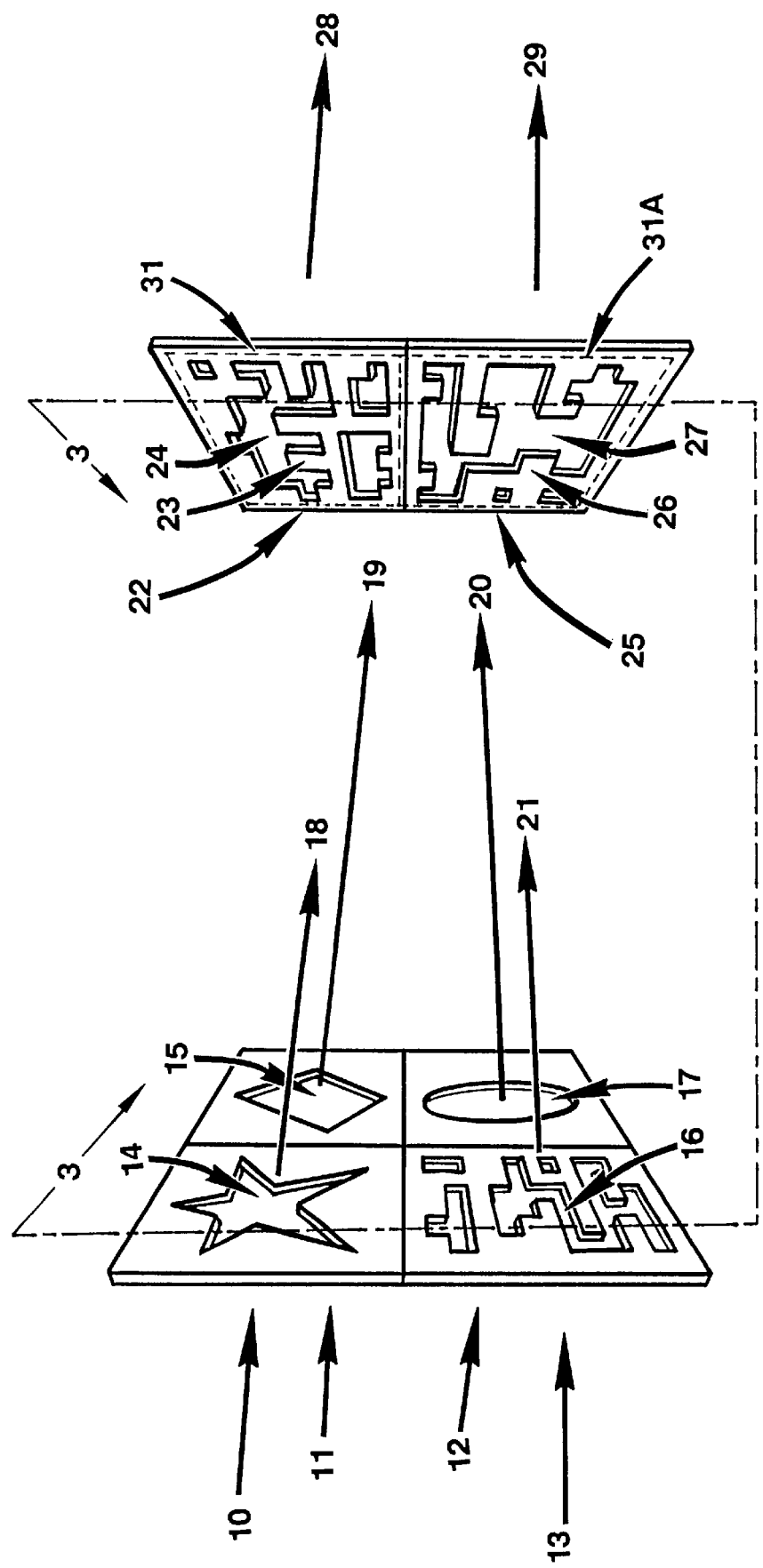

PATTERN-RECOGNITION COMPUTING AND METHOD FOR PRODUCING SAME

REFERENCE DATA

This application is a continuation-in-part of U.S. application Ser. No. 08/357,460, filed Dec. 16, 1994, now U.S. Pat. No. 5,623,366, and U.S. application Ser. No. 08/454,070 filed May 30, 1995, now U.S. Pat. No. 5,617,249, which is also a CIP of Ser. No. 08/357,460 now U.S. Pat. No. 5,623,366. Disclosure Document 347169, filed Jan. 31, 1994, with the U.S. Patent and Trademark Office, is hereby incorporated by reference.

BACKGROUND OF THE INVENTION

1. Technical Field

The present invention relates to pattern-recognition computing and to interference-based optical computers.

2. Background Art

The primary background art for the present invention is the applicant's U.S. Pat. No. 5,093,802, which teaches the basics of interference-based computing. In that patent, computer-generated (synthetic) holograms are described as a means for producing the computer functions claimed. Devices that use interference-based computing have come to be called "photonic transistors" even though the process will operate using non-photonic energy forms.

In the February 1994 issue of the *Computer Applications Journal* appeared an article by the applicant which explains the basics of conventional computer generation of holograms as they apply to two-input photonic transistors.

Absent from the previous information on interference-based computing are several fundamental processes that the present invention utilizes. These include:

1. The computer generation of pattern-recognition image (fringe) component separators.
2. The simultaneous recognition of multiple information-modulated input patterns.
3. The separation of complex pattern combinations from dynamic images.
4. The use of pattern recognition to produce computer logic.
5. The use of special interference (from application Ser. No. 08/357,460) in pattern recognition.
6. The use of frequency multiplexing of simultaneous logic functions (from application Ser. No. 08/357,460 and 08/454,070) in pattern recognition.
7. The use of arrays of the full operational range of optical elements that go beyond the simple opaque, clear, or phase-adjusted ability of the individual pixels that make up ordinary computer-generated holograms.

Non-computing applications of pattern recognition are commonly produced by photographic and holographic techniques in the laboratory. While such methods work well for picking out static letters of the alphabet from a typewritten page, they are not well suited for use in functional active logic, digital computing, or signal processing.

The use of pattern recognition in digital computing requires at least two different patterns that are independently modulated with pattern-illuminating energy to make even an elementary logic device. The energy from the two patterns must be combined to form a dynamic image that changes continually as logic action proceeds. Additionally, there must be an image component separator in order to eliminate from the output any energy from component parts of the dynamic image that would not contribute to the output in a manner in harmony with the rules of logic for the particular device being made. The present invention surpasses the previous methods by providing these necessary things.

According to the teachings of the present invention, one could make some elementary logic devices by simply guessing which patterns might work well, and then producing a functioning logic device by trial and error. However, to optimize output signal levels and waveforms, a method is needed for determining exactly which pattern shapes work best, especially when the device utilizes a multitude of inputs and performs complex computing functions.

The present invention also teaches both a method of calculating pattern-recognition wavefronts, optics and systems as these apply to interference-based computing, and a method of optimizing the input patterns to provide optimal output waveforms from given input-modulation sequences.

SUMMARY OF THE INVENTION

The present invention is a method of performing pattern-recognition computing, computer logic, signal processing, and related functions. It also includes a method of calculating the computer-generated optics used to implement the invention.

The basic method of producing pattern-recognition computing using multiple information-modulated input patterns of wave-type energy comprises the following steps:

a) producing a first input wavefront of said at least one wavelength having a first pattern modulated with quantized information resulting in a first set of modulation states;

b) producing at least one other input wavefront of at least one wavelength having at least one other pattern modulated with quantized information resulting in at least one other set of modulation states;

c) combining said first and at least one other input wavefronts to produce at least one dynamic image having component parts, and d) separating energy from a subset of said component parts that have a computing function relationship with said quantized information to produce at least one output, thereby providing a method of pattern-recognition computing.

Any wave-type energy that is capable of producing the required combining of wavefronts—including acoustical waves, moving particle waves, and electromagnetic energy—can be used in the present invention. However, in order to provide for a clear understanding, optical terminology will be used in this disclosure.

A wave having "quantized information" in a "set of modulation states" is a wave that is amplitude- and/or phase-modulated at discrete levels similar to the stair-step method used to simulate analog signals in electronics. Rather than being merely a progression of steps, though, the quantized information can exist at any predefined level. The term "digital" could also be applied. However, "digital" has generally come to mean "binary," and in the present invention many more than just two levels can be used to make up the set of modulation states.

Quantizing the input signals in the present invention has an effect similar to digitizing electronic signals into binary code. The effects of noise can be reduced or eliminated because the information being transmitted is not lost in noise variations. Likewise, quantization of the information used to modulate the inputs reduces susceptibility to noise variations. Quantizing the input information produces a set of modulation states for each independently modulated input. Each discrete combination of input states produces a discrete interference image having its own distribution of energy that is part of the set of images that make up the dynamic image.

On a micro scale, the minimum energy difference from one discrete input level to another is one quantum as commonly described for electromagnetic waves, along with its equivalent for non-photonic waves. Indeed, precision-built devices of the present invention are able to distinguish such finely divided levels. However, the use of the term "quantizing" herein is in no way restricted to single quantum increments, but includes multi-quanta-level differences as well.

When a device of the present invention operates using analog-modulated signals, the input fades from one discrete level to the next, and this produces a fading from one discrete output combination to the next. This process is often very useful in working devices, but is more difficult to calculate when producing the devices. As a result, quantization of the input information allows the calculating method of the present invention to optimize patterns and optics so as to provide optimized output waveforms over a range of discrete inputs that are able to simulate analog waveforms. This optimization can now be accomplished by the present invention even if the resolution must be calculated to the quantum level. The laws of physics do not allow for analog information to be transmitted in any finer resolution in any case.

Steps a) and b) above provide the multiple-pattern input, each pattern being illuminated and modulated to provide a set of input modulation states. Each combination of modulation states will produce a different interference image when the input wavefronts are combined in step c). The set of all interference images (including images that have a consistent energy distribution with no visible signs of interference occurring,) that result from the various combinations of input modulation states is the dynamic image. It is a "dynamic" image because it changes from one specific interference image to another as the inputs are modulated. Thus, as computation proceeds from one input to the next, the dynamic images change from one interference image to the next. Like frames in a movie film, each frame is a different image, but together they make up a complete moving picture.

Step d) is the extracting of logic or computing results from the complex dynamic image. The full area occupied by the dynamic image is divided into component parts by the constructive and destructive interference that occurs when the input wavefronts are combined. The size of these component parts is determined by the shape of the input patterns and the optics used to combine the input wavefronts. For ease of calculation and description, the dynamic image area can be divided up into much smaller parts, so that each component part is made up of one or more pixels. However, it is the changing energy levels in the component parts that make pattern-recognition computing work, even if a particular component part is only one pixel in size.

As the input information changes, so does the distribution of energy within the dynamic image. As a result, each component part and thus each pixel, changes energy level (phase and amplitude.) Taken individually, each pixel will produce a particular waveform over time as the inputs change from state to state, and may be used as an output.

As any particular sequence of input modulation states proceeds, a great variety of waveforms are available from the many pixel locations within the dynamic image. To design a particular logic or other signal-processing device (i.e., a device that performs a computer function), one or more pixels are chosen that produce output waveforms corresponding to the desired computer function.

If more than one pixel is chosen, energy from the plurality of pixels is first separated from the dynamic image and then combined together to provide the desired waveform output. When a number of pixels or component parts produce the same or nearly the same waveform, these constitute a subset of image components. When energy from such a subset is separated to become the output, its common characteristic waveform, as output, has a higher amplitude. When a subset is chosen that produces a waveform that relates to the input waveforms according to the rules of some computing function, the present invention performs computer logic by pattern recognition. Each combination of input states, along with the resultant output state, defines the computing operation performed.

As a result, time variations of the inputs produce signal-processed waveforms by sequential pattern recognition. Essentially, multiple lines of serial information are provided to the inputs. This information is processed in three important steps. Each serial line has a pattern impressed on it. The energy, and thus the information it carries, is combined in parallel into the dynamic image. Parallel signal processing, and thus information processing, occurs because of the laws of physics that produce the dynamic image, and because of the third step—the separation of energy from selected pixel locations within the dynamic image to produce the serial output. Thus, multiple serial input lines, processed in parallel, produce one or more serial lines out.

The introduction of patterns into the process is a substantial improvement over the prior art, first because it enables the production of dynamic images having a much greater variety of pixel waveforms than are produced by ordinary interference-producing methods. Second, because the patterns are a part of the apparatus doing the computing rather than coming in as part of the input information, the image component separator can be made to conform to a particular set of interference images; that is, the particular energy distributions that occur in the pattern-produced dynamic image. Third, the input patterns used can be changed during the design process so that the most efficient set of coordinated optics can be found through calculation. Fourth, the patterns, the optics that impress them on the input, the dynamic images, and the image component separators are all coordinated together to function as an efficient unit, tuned, as it were, to perform its computing function.

Related to the subsets of pixels, chosen because they match a particular computing function's waveform, are other subsets that produce complementary waveforms which may have the same amplitude variations, but may have phase variations or vice versa. When pixel-sized or component-part-sized optical elements are introduced at appropriate locations within the image component separator, one or more of these complementary waveforms can be combined to provide a stronger or modified output waveform. Multiple complementary subsets can also be combined into multiple outputs. The net result of this secondary combining of energy from multiple subsets is the production of a larger variety of possible output waveforms from a given group of input states. This makes the present invention more versatile.

Modern optical technology also allows for the use of a much wider variety of optical elements at each image component separator than the simple clear, opaque, and phase-changing elements of conventional holograms, although these are certainly important elements. The present invention is also able to use lenses, mirrors, color filters, or any other optical element in the array of optical elements that make up the image component separator. In fact, such arrays of optical elements can also be used at the location of the pattern inputs so as to better tailor the full optical arrangement for a particular task.

The present invention has the capability of performing many complex logic operations simultaneously. These include such operations as address decoding, multiplication, division, addition, subtraction, and quite a large number of other computing operations. The operation is similar to a table look-up function.

Each combination of inputs is a form of address. Each address produces a specific interference image as part of the dynamic image. The image component separator is made by selecting subsets of components that are separated to produce one or more outputs which then represent the information found at the address selected. As the input "addresses" represent data to be computed, the output represents the results of computation that have been "looked up" in the image component separator.

In another configuration, a number of outputs can be produced, each with its own output waveform, for a given set of inputs. If eight such outputs are used, the table look-up operation produces an output byte. Likewise, any number of outputs can be used to form parallel words of any desired length, images, or any other form of parallel energy carrying information. If the group of outputs form a pixel image, the present invention can be used to table-look-up a series of images.

Consequently, the present invention is very useful for storing information as a read-only memory which can be calculated into the coordinated optics that include the image component separator and the group of input patterns, rather than being written into as with a CD ROM master.

The next step is to manufacture coordinated optics packaged in a modular unit which can be removed and replaced in a computing system like chips in an electronic computer, a removable CD ROM, or an optical "hard drive." The reasons for packaging the entire coordinated optics set rather than just a single image component separator or set of patterns will become more apparent in the discussion below that explains the process for computer generation and optimization of the optics involved. The input signals that illuminate the input patterns and the output signals produced can be easily standardized, while the input pattern set and the image component separator are individuals that result from calculating and modifying them as a team.

Frequency-multiplexed operation can be achieved with the addition of the following modifying steps to the basic method set forth above:

said at least one wavelength includes a plurality of wavelengths, each of said plurality of wavelengths being independently modulated with quantized information having independent said computing relationships, thereby providing a method of frequency-multiplexed pattern-recognition computing.

Interference images of different frequencies can exist within dynamic images without cross-talking between them. The present invention takes advantage of this physical quality so as to permit the simultaneous and parallel operation of multiple computing operations using a single coordinated optics set. Further information is provided in the quotations from application Ser. Nos. 08/357,460 and 08/454,070 below.

Outputs can be produced that contain both amplitude- and phase-varying waveforms by further modification of the basic method as follows:

separating phase-varying energy from said subset of said component parts when said subset of said component parts has energy which varies in phase when different sets of said pattern sets are energized, thereby providing said at least one output having phase-modulated energy.

Phase-modulating one or more of the inputs with quantized information produces a different dynamic image, just as amplitude modulation or frequency modulation does. Having a different dynamic image requires a different image component separator to produce the same waveforms output. However, most dynamic images will have component parts that contain phase variations regardless of the modulation type chosen for the input. These areas too can be used to produce outputs having phase variations.

In a further modification of the basic method above, outputs can be produced which use special interference, discussed in greater detail below in quotations from application Ser. No. 08/357,460. The modified steps are:

separating energy which varies according to the tenets of special interference from said subset of said component parts when different sets of said pattern sets are energized, thereby providing a method of pattern-recognition computing using special interference.

When non-optical energy forms are used, the signals from the modulated patterns produce a dynamic combination that is separated by a means appropriate to the energy form being used. For example, if the inputs are patterns of electrons, it is apparent that "optical elements" cannot be used to separate an output signal from a dynamic combination. If the patterns are combined in free space or some other medium, then electric and magnetic fields are used to accomplish the required separation. Acoustical patterns, likewise, require acoustical means for separating energy from the dynamic combination. Also, the coordinated optics become coordinated pattern-combining means and dynamic combination separating means. It is therefore intended that these non-optical methods be included in the present invention, even though the body of this disclosure uses optical terminology as stated above.

In general, whether optical or non-optical methods are used, pattern recognition computing is accomplished by the dynamic recognition of modulated patterns. Therefore a dynamic pattern-recognition computer is comprised of:

a first input capable of inputting a first modulated pattern;

at least one other input for inputting at least one other modulated pattern;

at least one output means;

combining means for combining said first and at least one other modulated patterns to provide an output signal at said at least one output means, such that each modulation combination of said first and at least one other modulated patterns results in a discrete output, thereby providing a dynamic pattern-recognition computer.

CALCULATION OF COORDINATED OPTICS

Four primary things affect the distribution of energy within the dynamic image. They are the shape and/or organization of the input patterns, the modulation states of the input patterns, the optics used to combine the wavefronts to make the dynamic images, and the separator optics used to form the outputs. To produce working optimized embodiments, the present invention provides for a special method of calculation that is able to calculate the complexity of dynamic images and produce the coordinated optics involved in a particular embodiment.

For example, a certain embodiment may have three inputs, one with a pattern in the shape of a square, one in the shape of a circle, and one in the shape of a star. When the star pattern is on and the other two are off, a single interference image will appear at the dynamic image location. When the circle and the square patterns are on but the star is off, a different interference image will appear at the location of the dynamic image.

The dynamic image can be divided up into pixels, so that one set of pixels will be energized when the star pattern is on, and another when the circle and square are both on. Of these, a subset will be energized only when both the circle and square are on, but will not be energized any time the star is on.

If the image component separator is made up of an array of clear or opaque pixels, one subset of pixels can be used to pass energy into the output while energy from the other pixels is blocked. With separation of energy from only those pixels that are on when the circle and the square are on but the star is off, a decoding logic function takes place so that the output is on only when the inputs to the circle and square are on and the input to the star is off. Such a subset of pixel-sized component areas can be selected so as to produce an output for any input modulation combination.

But should the star be a star? Perhaps it should be shaped like the letter q or like a moose head. Seldom would such patterns produce optimal computing waveforms. The first process in determining how a coordinated optics set needs to be organized is to calculate the energy distributions within the dynamic image for every combination of input modulation states.

The method of calculating individual interference images within dynamic images comprises the following steps:
  a) producing a first input model describing a first input wavefront having a first pattern modulated with quantized information which produces a first set of modulation states;
  b) producing at least one other input model describing at least one other input wavefront having at least one other pattern modulated with quantized information which produces at least one other set of modulation states, and
  c) producing a dynamic image model describing image components of at least one dynamic image by calculating energy distributions that result from combining said first input wavefront and said at least one other wavefront at the position of said dynamic image for combinations of said sets of modulation states,
    thereby producing a mathematical model of energy distributions within said dynamic image that result from combining energy from multiple modulated input patterns.

Energy distributions at several places in each device being produced are calculated as models. That is, mathematical descriptions of the energy at those points are calculated. Such descriptions can include an array of amplitude and phase vectors, or any other suitable mathematical description that can be used in subsequent calculations.

In a) and b) above, the models are of wavefronts coming from the illuminated patterns. Each model includes not only the wavefront's pixel pattern, but also the quantized modulation states that result from the quantized information. This information is used to describe the modulated input patterns of pixels for every quantized state that will be used in the final device.

It should be noted that all possible input combinations need not be calculated each time the method is used. Experience, records of past calculations, and limiting the number of input state combinations to only those combinations that will actually be needed for the final application of the device being designed can be used to reduce the computational load within the method of the present invention.

Step c) is the production of a model of the dynamic image divided into pixels. This model contains a calculated description of the wavefront at every pixel in the dynamic image for every needed combination of input modulation states for all inputs. Clearly, a very few inputs with only a handful of modulated states require a considerable amount of calculating. Not so long ago, an invention such as this would have been impossibly difficult to produce. With today's high-speed computers and the introduction of the first fully optical computers, however, such immense number-crunching processes have become workable. Or course, many of the calculations contain considerable redundancy which can be used to advantage in reducing the work load.

The laws of physics provide for a number of mathematical methods of wavefront analysis. These include summation of amplitude and phase vectors, Fourier analysis, and a number of others. Any suitable mathematical algorithm(s) that are able to provide the information needed for the models can be used with the present invention.

Once a description of the dynamic image is achieved, the next step is:
  d) selecting, from said dynamic image model, image component subsets that are able to contribute to the production of an output waveform having a computing function relationship with said modulation states,
    thereby producing a mathematical model describing energy distributions within said dynamic image that can be used to produce said pattern-recognition computing.

This step is actually a search through the dynamic image model to find pixels with waveforms or complementary waveforms that can be used to contribute to at least one combined output that is coordinated with specific input states according to the rules of operation for the device under construction. That is, if the device is to be an AND circuit, pixels are chosen from the dynamic image that can contribute to an output that behaves as an AND, and so on for whatever device is being made.

After a method of calculating energy distributions within dynamic images and determining which parts of a dynamic image can be used to produce the needed outputs is arrived at, the next operation is to incorporate this method into a method for producing a coordinated set of optics that includes both an image component separator and the set of input patterns that operate it.

The next step in determining how to build the separator is:
  e) producing a separator model describing an array of optical elements for separating energy from said image component subsets to produce at least one output,
    thereby producing a mathematical model of pattern-recognition optics that have been coordinated with said dynamic images produced from said multiple modulated input patterns.

Once a separator model coordinated with the input patterns through the dynamic image is produced, the next step includes the production of a model of a separator capable of using complementary subsets to produce common outputs because the optical elements in the separator array are used to modify energy from the complementary subsets to enable them to contribute to the common output waveform. The "image component subsets" of step e) include all contributing image components, and the model description of the optical elements includes information about the individual optical elements needed to make complementary waveforms contribute positively to the final output.

Having produced all of these models, we now have a description of a working, but not necessarily optimized, device.

Changing the shape of an input pattern changes the distribution of energy within the dynamic image. As a result, special patterns can be selected that produce energy distributions within the dynamic image that are more conducive to producing certain types of outputs. By changing the input patterns and then coordinating them with the image separating optics, optimized devices are produced. To produce an optimal optics set, the next two steps in the method of the present invention are:

f) changing at least one of the following: (i) said first pattern description within said first input model, and (ii) said at least one other pattern description within said at least one other input model; and g) iterating steps c) through f) until a substantially optimized pattern-recognition configuration is achieved, thereby producing a description of an optimized said array of optical elements for accomplishing said pattern-recognition computing.

Making incremental changes in at least one of the input patterns will produce a different coordinated optics set for each optics set for each of the input patterns. On each successive iteration, the new optics set is compared with the previous optics set(s). After a number of iterations, this process will produce a substantially optimized coordinated set of optics having a set of input patterns that provide improved performance when used with their matching optics as compared to other pattern-and-optics arrangements.

The next improvement in the present method is to include an individual array of input optical elements for each input. The quantized information-modulated inputs pass through the arrays of input optical elements to both impress the pattern on the input energy and produce specialized input wavefronts that can be optimized into a more efficient arrangement.

The method of producing a mathematical model of a dynamic image for use in pattern-recognition computing using input arrays of optical elements thus comprises the following steps:

a) producing a first input model describing (i) a first input wavefront modulated with quantized information which produces a first set of modulation states and (ii) a first array of input optical elements for impressing a first pattern on said first input wavefront;

b) producing at least one other input model describing (i) at least one other input wavefront-modulated with quantized information which produces at least one other set of modulation states, and (ii) at least one other array of input optical elements for impressing at least one other pattern on said at least one other input wavefront, and c) producing a dynamic image model describing image components of at least one dynamic image by calculating energy distributions at the position of said dynamic image for combinations of said sets of modulation states that result from combining said first input wavefront modified by said first array of input optical elements and said at least one other wavefront as modified by said at least one other array of input optical elements, thereby producing a mathematical model of energy distributions within said dynamic image that result from combining energy from multiple modulated patterns;

d) selecting, from said dynamic image model, image component subsets that are able to contribute to the production of an output waveform having a computing function relationship with said modulation states, thereby producing a mathematical model describing energy distributions within said dynamic image that can be used to produce said pattern-recognition computing;

e) producing a separator model describing an array of output optical elements for separating energy from said image component subsets to produce at least one output, thereby producing a mathematical model of pattern-recognition optics that have been coordinated with each other and said dynamic images as produced from said multiple modulated patterns;

f) changing at least one of the following: (1) said first array of input optics within said first input model, and (ii) said at least one other array of input optics within said at least one other input model, and g) iterating steps c) through f) until a substantially optimized pattern-recognition configuration is achieved, thereby producing descriptions of substantially optimized said pattern-recognition optics.

At each iteration, the quality of the output waveforms can be examined to determine whether or not recent pattern changes have contributed to the production of a better device. The process of selecting a new pattern can be an automatic one, such as by adding or deleting a pattern pixel, or by human intervention and intuition, or by some other method, including trying all possible patterns and choosing the best one.

By these methods, a wide variety of logic, signal processing, and other computer functions can be produced, optimized and utilized. Such functions include all functions based on special interference, frequency multiplexed logic, and any other interference-based computing function using any wave-type energy form.

INFORMATION FROM PRIORITY APPLICATIONS

Certain subsets of dynamic image component parts produce waveforms that obey the tenets of special interference.

The following quotations from U.S. application Ser. No. 08/357,460 explain the tenets of special interference used in the present invention. (Abbreviations: di=destructive interference, ci=constructive interference.)

(from page 2 line 4)

"These special interference phenomena are produced whenever the geometry of the apparatus is such that energy from a plurality of beams causes destructive interference at the first location(s) where energy from the input beams appears when any one of the input beams is on by itself. Since the law of conservation of energy requires that the energy in the beams not be destroyed by the destructive interference, when an out-of-phase beam is on, the energy must appear somewhere else. Depending on the geometry of beam superposition, the energy will be reflected, or diverted to a position adjacent to the first location(s), or at some angle in between. The important result is that energy from the plurality of beams is actually diverted away from the first location(s) where destructive interference occurs and on to a second location where constructive interference occurs, outside of the area where at least one input beam appears in the absence of interference.

In the most elementary examples, having only two input beams, two types of special interference are manifest. With the first type, neither of the input beams contribute energy to the second location when either one is on by itself. When both input beams are on, interference causes energy from both beams to appear at the second location.

With the second type of special interference, the first input beam contributes no energy to the second location when it is on by itself. When the second input beam comes on, interference causes energy from both input beams to appear at the second location. However, energy from the second beam does appear at the second location when it is on by itself.

Some embodiments and applications of the present invention is able to use either type of special interference. There are some things, however, that require one type or the other, but will not work for both types; e.g., the logical AND, discussed below.

The individual beams, in either type of special interference, actually produce images at the locations where interference takes place, even if these images are just simple spots. These images then interfere with each other.

In complex images, one or more input beams are able to produce image component area(s) that correspond to the simple examples above. The inputs are subsets of a plurality of input beams that form images. When only one beam set is on, and as a result its image is on, the energy pattern defines a set of "first" locations by the presence of energy. When at least two of the subsets are on, interference occurs between the two images, and energy from both images is removed from the first locations by destructive interference. That energy then appears at the second location(s) because of constructive interference. The second locations lie outside of the area where the first locations are.

Holograms, especially but not exclusively computer-generated holograms, like other pictures, are made up of individual pixels. From each pixel comes a group of rays that eventually combine to produce the wave-front reconstructed holographic image. As a result, each spot on the image is produced by a group of rays from the hologram. The rays constitute a set of beams. When a whole set of beams are modulated in concert, the image it produces, and the complex interference that occurs between it and other images is also modulated. Interference between such images, made by subsets of all input beams, are also able to be used to produce the special interference phenomena used by the present invention.

The important difference between these special interference phenomena and Young's fringes used in the prior art is that energy from at least one of the input beam sets, which appears at the second location(s), appears while interference is occurring, and does not appear at that location(s) in the absence of interference. On the other hand, the input beams used in Young's fringes do appear at that second location(s) in the absence of interference, when any of those beams are on by themselves.

These special phenomena are analog in nature, in that the amount of energy that appears at the second location(s) is proportional to the amount of energy in the two input beams or images. The energy appearing at the second location(s) has been diverted from the first location(s).

If one input is held constant, and a second input(s) is increased, the amount of energy contributed to the second location(s) from the first input(s) reaches a limit where the addition of more energy in the second input(s) is unable to cause more energy from the first input(s) to appear at the second location(s).

The phenomena may be utilized in digital energy circuits through the use of discrete levels for modulating the input beams, to establish discrete states of the interference images, having discrete amounts of energy in their component parts."

(from page 49 line 12)

"38. Basic theory of operation

Applicant theorizes that the amplitude and intensity of energy at the purely constructive interference locations, using the first type of special interference, are able to be calculated using an adaptation of the standard vector sum of amplitudes method used with other interference phenomena.

The basic formula for intensity has been derived from the law of cosines and considers just two incoming rays.

That formula is:

A=amplitude of the first beam.

B=amplitude of the second beam.

Theta=phase difference between the two beams.

Intensity=I=$A^2$+$B^2$+2AB Cos(Theta)

The Total amplitude $T_{ci}$=square root of I, just as $A^2$=the intensity of amplitude A.

At the center of the constructive interference (ci) area, Theta =0, and the Cos(Theta)=+1. At the center of the destructive interference (di) area, Theta=180 degrees, and the Cos(Theta)=−1. As a result, the vector sum of two amplitudes at these two locations is also the algebraic sum of the amplitudes.

The two rays are in phase in the ci area, so the sum has that same phase. As a result, the ci intensity formula is, $$I_{ci}=A^2+B^2+2AB=(A+B)^2$$

In the Di Area

The two rays are out of phase in the di area, so that the vector sum is the difference of the two amplitudes, which takes on the phase of the largest of the two. If they are equal, the algebraic sum is zero. The di formula for intensity becomes:

$$I_{di}=A^2+B^2-2AB=(A-B)^2$$

These two conditions are also able to be viewed as the vector sums of three different rays, which will be labeled $B_1$, $B_2$, and U. In the di area, B=−$B_1$=$B_2$, so that U is the difference between A and B, and A=B+U When A is on by itself, the amplitude at location 1 is the vector sum of $B_1$ and U. The intensity is $(B_1+U)^2$.

When beam $B_2$ comes on it combines with the first two. Since it is 180 degrees out of phase with $B_1$ and U, the totals of amplitude and intensity are as shown in formulae 1.

Formulae 1, di location for all of the interference types:

$$T_1=T_{di}=B_1+U-B_2=U$$

$$I_1=I_{di}=(B_1+U-B_2)^2=U^2$$

also, by substitution we get:

$$I_1 = I_{di} = A^2 + B^2 - 2AB = (B + U)^2 + B^2 - 2B(B + U)$$
$$= B^2 + 2BU + U^2 + B^2 - 2B^2 - 2BU$$
$$= U^2$$

This is exactly what is expected because the amplitudes add algebraically, and the intensity is the square of the amplitude.

This indicates that the addition of an out-of-phase beam smaller than the first beam leaves energy having an amplitude equal to the difference of the two. If it is viewed as the sum of three beams, two of which are equal in amplitude but of opposite sign, the third beam is equal to the amplitude of the energy remaining at this location after all three have been summed.

The process of interference relocates energy within a fringe image. The equivalent amount of energy that is missing from the di areas appears in the ci areas. As shown above, when two unequal beams interfere destructively, not all of the energy in the di areas is relocated into the ci areas. The remainder is exactly equal to the difference between the two unequal beams. This remainder has not been relocated; it continues to arrive at the di location. As a result, this remaining energy is able to be called "undiverted" energy, because it has not been diverted into the ci areas by the interference.

As a result, one is able to describe the energy which is apparently missing from the di area as "diverted" energy.

In Young's Ci Area

In the case of Young's type interference, the amplitude of energy arriving at a second location, namely the ci area, when only one beam is on is A. A is able to be considered as the sum of two amplitudes $B_1$ and U.

Again, when beam $B_2$ comes on, it combines with the first two. Since it is in phase with $B_1$ and U, $B=B_1=B_2$, and the totals of amplitude and intensity are as shown in formulae 2. Formulae 2, Young's interference type in either amplification or saturation:

$$T_2 = T_{ci} = B_1 + U + B_2 = 2B + U$$
$$I_2 = I_{ci} = (B_1 + U + B_2)^2 = (2B + U)^2$$

also, by substitution we get:

$$I_2 = I_{ci} = A^2 + B^2 + 2AB = (B + U)^2 + B^2 + 2B(B + U)$$
$$= B^2 + 2BU + U^2 + B^2 + 2B^2 + 2BU$$
$$= 4B^2 + 4BU + U^2$$
$$= (2B + U)^2$$

This is also exactly what is expected because the amplitudes add algebraically, and the intensity is the square of the amplitude.

In this case, Young's type interference has energy directed to this ci location when only one beam is on. It is able to be viewed as having two components. When the second beam comes on, energy from the di area is diverted into the ci area. As shown above, the amount added to the ci area by interference exactly equals the amount removed from the di area.

As a result, two equal parts exist, $B_1$ and $B_2$. One came from beam A and the other from beam B. The difference between the two is U.

In both the ci case and the di case, U remains unchanged. It has been called "undiverted" energy. Apparently, it remains unaffected by the interference that is taking place between $B_1$ and $B_2$, even in the ci area.

If B rises to become equal with A, U drops to zero at both places. The resulting interference image goes completely dark at the di location, and the intensity at the ci location goes to $4A^2 = 4B^2$. All of the energy contributes to the interference image.

When A and B are not equal, the image formed is able to be viewed as being the sum of two images. One image is the interference image formed by portions $B_1$ and $B_2$ in the familiar interference fringe pattern. The other image is a consistent spot, having no contrast change from one part to another; its amplitude equals U, and its intensity is $U^2$.

As a result, U, the difference between two unequal beams, can rightly be called "undiverted," for it arrives at the same locations and in the same pattern as when $B_1$ and $B_2$ are off.

$B_1$ and $B_2$ are rightly called "diverted" energy, because this energy has been rearranged, or "diverted," in order to form the interference image. In that image, the energy from the di location is diverted into the ci location to combine with an equal contribution from the other beam that will arrive there anyway in the absence of interference.

In Special Interference

Next, we examine special interference. Special interference has no contribution to location 2, the ci location, when only one beam is on. This occurs because the beams are small in comparison to the di location, and are directed only toward the di location, and are not spread out to cover the location where ci will eventually take place.

The di area functions exactly as described above, as having two in phase beams from A, with the out-of-phase B.

The ci area has no energy in the absence of interference. Most importantly, it has no "undiverted" energy (that is, U=0).

When the second beam ($B_2$) comes on, interference occurs producing an interference image that removes energy from the di location, ($B_1 - B_2$), leaving U as residual energy.

The energy removed from the di location is diverted into the ci location as $$B_1 + B_2.$$

It has an intensity of $(B_1 + B_2)^2$.

Again by substitution we get:

$$I_2 = I_{ci} = A^2 + B^2 + 2AB = (B + U)^2 + B^2 + 2B(B + U)$$
$$= B^2 + 2BU + U^2 + B^2 + 2B^2 + 2BU$$
$$= 4B^2 + 4BU + U^2$$
$$= (2B + U)^2$$

However, U=0 at this location, producing the important relation as shown in formulae 3.

Formulae 3, first interference type in either amplification or saturation:

$$T_2 = 2B$$
$$I_2 = (2B + 0)^2 = 4B^2$$

As a result, a formula for the first type of special interference has been derived for both the amplitude and the intensity.

The total amount of energy in any one application depends upon the area of ci and the area of di, because they are able to be made up of many rays, even thousands or billions of rays. The total energy is able to be expanded to cover large areas, or focused to small areas. The output characteristics will be a function of the size, locations, and the ratio of output area to image area of the image component separator relative to the image. Contributions of energy from the other parts of the image that are not pure ci or di also contribute to the overall operation of the invention.

The importance of these formulae to the process of amplification and limiting cannot be overstated. As an example, a substantially constant power beam A that is directed to location I and a control beam B (which is smaller than A) produce an interference image at locations 1 and 2, with di at 1, and ci at 2.

The output intensity is $4B^2$, and the amplitude is 2B. It does not matter how much larger A is than B, within the limits of the breakdown of the optics or other factors that would physically change the arrangement. Energy diverted into the output is directly proportional to the control beam B.

When the control beam is amplitude modulated, the output is also amplitude-modulated, having twice the amplitude of the control beam. The energy in the information carrying portion of the output waveform has been doubled. Unlike the amplifier of the prior art that uses Young's interference, the present invention does not produce the residual output U, the undiverted leftover energy that does not contribute to the interference image.

As long as the modulated beam is smaller than the constant beam, the output will be amplified. The output amplitude is always double the smaller of the two.

Next consider what happens when the modulated control beam rises above the level of the constant power beam. With B>A, for any given instant the output will be twice the smaller of the two. It is the same as switching the beam names in the formulae above. Because the smaller one is also the constant one, the output will be a constant 2A no matter how highly B is modulated, again within the realm of not destroying or modifying the optical arrangement. This condition is called "saturation." All of the energy from beam A that is able to be has been diverted into the output.

As a result, the amplification curve of the present invention is NON-LINEAR. Non-linear optics that operate at the speed of light is able to accomplish many tasks that are otherwise impossible. A modulated waveform will be limited and clipped at the point where the two input beams are equal.

Second Type of Sspecial Interference

The second type of special interference is also able to be viewed as having three component amplitudes. The power beam (A) is directed to the di location; none of it is directed to the ci location, just as with the first type of special interference.

The control beam (B) is directed to both locations. For that reason, this type of interference will not produce a logical AND in a single stage; however, it makes an excellent amplifier.

When the control beam is off, $I_2=0$, and $I_1=B_1+U$.

When the control beam is less than the substantially constant power beam, $A=B_1+U$, and $B=B_2$.

The amplitude at location 1 will be $B_1+U$.

Formulae 4, 2nd interference type in amplification:

Amplitude=$T_2=B_1+B_2=2B$

Intensity=$I_2=(B_1+B_2)^2=4B^2$

This is the same as with the first type of special interference. The difference appears when the arrangement goes into saturation. When that occurs, the undiverted energy (U), which equals B−A (because B is larger) does not come from the power beam. In this case the residual energy comes from the control beam which is directed straight into the output. As a result, the output during saturation is as shown in formulae 5.

Formulae 5, 2nd interference type in saturation:

Amplitude=$T_2=B_1+B_2+U=2B+U=2A+U$

Intensity=$I_2=(B_1+B_2+U)^2=4A^2+4AU+U^2$

Amplification is reduced because A is constant. All of the available energy of the power beam has been diverted into the output. Further increases in B only increase the size of U, which is not doubled. When squaring to produce the intensity, the 4AU factor indicates that there exists some interaction with energy from other parts of the interference image, but U remains the same.

As a result, this second type of special interference behaves like the first type of special interference when B<A. However, it behaves like Young's interference when B>A. Amplification is still limited somewhat, but it is not clipped.

Broad Band and Narrow Band Arrangements

The above-described process is phase-dependent. The energy removed from the di location is relocated in the ci position. But what if the signals arrive at the first location at some other phase? In this case, the ci position is at some other location, resulting in near binary operation of a phase-modulated signal. The inputs would have to be exactly out of phase in order for the ci location to be the same as the output location.

In practice, the optics used will have to be engineered in wavelength units and wavelength sizes. Most optical arrangements rely on an averaging of energy from multiple points of the cross-section of an input beam. Averaging of energy from these multiple points produces the familiar sinusoidal interference fringe.

If the amplifier is engineered to include a large number of such points so as to use the averaging principle, then it will have a wide bandwidth and will be able to function using a number of input frequencies. The output locations function as if a group of controllers were placed side by side, each one using an individual ray set.

In this case, the output hole includes a large number of wavelength size locations. For slightly different phases and slightly different frequencies, the ci location from each pair of input locations will be at slightly different output locations. If those output locations happen to be within the area of the hole, the energy will output. If they are not, it will not.

Modern optics is capable of operations at wavelength sizes. Wavelength size input beams and wavelength size output holes will produce processes that operate considerably differently from the multiple-location averaging style of optics. The more precise the optics are, the more precisely phases and frequencies must be in order for the ci area to hit the output hole.

Wavelength size precision will cause a phase-modulated signal to output only when the phase is close enough to 180, at the first location, in order for the ci area to hit the wavelength size output hole. The output from an analog phase-modulated signal would be a binary output that occurs only when the two inputs are exactly out of phase.

If multiple frequencies are used, the only ones that will be able to hit the output hole will be those that match the wavelength geometry so that the ci location is where the tiny hole is.

As a result, each method and each device must be engineered to produce the type of amplifier needed. If a phase demodulator is to operate with an analog input, it will have to be of the averaged, multiple location (broad band) type. If it is to be used in a binary circuit, then the single wavelength-size location (narrow band) type will work quite well.

It is possible to produce a considerable number of composite operations by using a number of wavelength-size controllers having a common first location, but separate output locations; thus, a variety of signals are able to be handled all at once.

A frequency division demultiplexer is able to be produced by inputting the beams from different locations directed to a common location. Each different frequency will produce its $c_i$ at a different output location. If each output location has its own output hole in the image component separator, a complex group of frequencies in the input will be separated into separate outputs. Meanwhile, it will filter out any frequencies in between, because no output hole is provided for those frequencies, and no matching input frequency is provided.

If the control input is directed to a common location and a number of power inputs are used, each having a different frequency and a different location, the geometry is able to be arranged so that the $c_i$ locations all match, producing a very accurate frequency-selectable filter. All frequencies that match a power beam will have their $c_i$ at the common output hole. All other frequencies will not. The difference between this arrangement and the broad band averaging arrangement is that each of the frequencies that pass through the filter must match precisely the frequency and phase of the power beam. At wavelength sizes, filters are capable of providing the best selectivity of any known means, especially at light wave frequencies and beyond.

These basic principles of operation produce functions similar to the way electronic transistors perform similar functions. As a result, the present invention warrants the common name "photonic transistors." Even though the present invention is quite capable of using non-photonic wave-type energy, photonic embodiments are expected to become the most common in operation."

The present invention is also able to produce pattern-recognition computing using frequency multiplexing of computing functions.

The following quotation from U.S. application Ser. No. 08/357,460 explains the use of special interference in frequency multiplexed systems.
(from page 17 line 31)
"12. Active Filter The present invention is able to be used as a phase and frequency sensitive, precision active filter using the first type of special interference. If either of the input beams contains energy that is not of the same frequency and opposite phase of the other input, no uninverted output will occur. As a result, the present invention is able to be used to demultiplex frequency multiplexed signals, distinguish colors, and demodulate frequency-modulated and phase-modulated signals.

If more than one color (wavelength) is supplied to both beam sets, a single device will operate independently and simultaneously at each wavelength. As a result, the present invention is able to be used to switch, separate, and organize broad-band signals.

By supplying multiple-wavelength energy of a substantially constant (above-zero) level(s) as the first beam set of a gated amplifier, along with a multiple-wavelength second beam set, an amplified signal that matches each wavelength that occurs simultaneously in both inputs will appear at the output. By switching the individual wavelengths of the power beam set on and off, the filtering process is able to be gated for selecting and demultiplexing the matching signals.

A plurality of these active filters are able to be used either in parallel, or in a tree structure to demultiplex frequency multiplexed signals of all kinds, including those used in optical fiber transmission, microwave and even radio.

The active filter uses the present, basic invention by adding these steps to the means and method:

a. Providing the first beam set with energy at a constant above-zero-level having at least one wavelength, and often several wavelengths;

b. Switching wavelengths of the first beam set off and on to gate filtering of those individual wavelengths off and on;

c. Providing the second beam set with energy at multiple wavelengths to be filtered, and d. Producing special interference with a subset of the multiple wavelengths matching the first beam set wavelengths and rejecting all other wavelengths, thereby providing a means and method of gated active filtering by producing an output only at wavelengths that exist simultaneously in both input beam sets.

13. Removing Signals Using an Active Filter

It should be noted that either type of special interference is able to be used for filtering, but the relationships between the input signals and output signals in the second type of interference differ somewhat from those in the first type of interference.

With the second type of interference, the filtered, uninverted output will contain a contribution from the second beam set unless the second beam set is equal to and in phase with the first beam set's wavelengths, in which case constructive interference will occur at the first location(s) at those wavelengths removing that energy from the second location(s) and the uninverted output.

Adding an inverted output, as with the inverter above, produces an output which is differential to the uninverted output at every wavelength present in the power beam, but is not differential at other wavelengths.

The procedure for producing a differential active filter, using either type of interference, begins with an amplifier with an inverted output and continues with the following steps:

a. Providing the first beam set with its substantially constant above-zero level energy having at least one wavelength;

b. Providing the second beam set with multiple wavelengths to be filtered, and c. Producing interference with a subset of those multiple wavelengths that match the at least one wavelength in the first beam set to divert energy of matching wavelengths away from the first location(s) and into the second location(s), thereby providing an inverted active filter by producing an inverted output deficient of wavelengths which exist simultaneously in both input beam sets. This inverted output is differential to the uninverted output, just as with the inverter above, only in this instance, inputs having a variety of wavelengths are provided for the purpose of filtering, removing, and separating one wavelength from another while preserving any information present in the wavelength(s) being filtered.

14. Frequency Demultiplexer.

Frequency multiplexing is easily performed by combining individually modulated signals of different frequencies into a common beam path. Demultiplexing is more complex. The procedure used in building a frequency demultiplexer is:

a. Provide a plurality of active filers;
b. Provide a frequency multiplexed beam set having a plurality of modulated wavelengths;
c. Direct a portion of the frequency multiplexed beam set into the second (control) beam set of each filter, and
d. Provide the first beam set of each filter with a different frequency of energy matching each of the plurality of modulated wavelengths,
  thereby providing a frequency demultiplexer by producing a separate modulated output, from each filter, matching each different frequency.

The second type of special interference is not used, because frequencies not having a matching power beam will pass through into the output.

If the second beam sets of the active filters use the same input and first locations, step c. above happens simultaneously as the energy is being directed to that first location. Each frequency will produce a ci at a different location, where the separate outputs are taken."

Additionally, the following quotation from application Ser. No. 08/454,070 contains further information about frequency multiplexed logic in general, which can also be incorporated into the present invention.
(from page 3 line 3)

"The present invention comprises a means and method for providing frequency-multiplexed functions including logic, amplification, and energy beam control. A common set of optics produces simultaneous, independent functions on independent frequency channels within a single device. Individual channels of the frequency-multiplexed output contain the results of individual functions performed on the channels individually.

Input beams contain multi-frequency energy wherein individual frequency channels function as independent carrier waves that are modulated independently with information which is to be used within the invention. The invention has a plurality of such frequency-multiplexed inputs. Interference is produced simultaneously among all of the inputs which produces a separate interference image for each carrier wave frequency channel. Because common optics are used to produce interference, all of the images tend to overlap each other in the same general area, although some frequency separation does take place.

While the overlapping images can be called a composite image, the fact is that a modulation change in a single channel produces a change in only that interference image which has been produced by energy of that particular wavelength. The other images produced by energy from the other channels are unaffected.

An image component separator, such as a mask, permits energy to pass through into the output from one or more locations that are chosen specifically because of their relationship to the individual images. As a result of overlapping, the output is taken from the individual images from these same locations at the same time. The function performed using energy from each individual channel depends upon the modulation characteristics of the input beams for that channel, the shape of the interference image for that channel, and locations within that image from which energy is being taken. These parameters can be engineered into a particular device by the proper selection and orientation of optical elements, and by the selection of modulation patterns and phases of the individual channels.

As a result, the present invention can provide the logical AND for one channel, the logical OR for another, an amplifier for a third, and so on, depending upon the individual parameters for each channel as they relate to the common optics being used.

When common optics are used, the output is also frequency-multiplexed, and it contains the results within each channel of the function performed individually within the invention.

Frequency-multiplexed logic has the advantage of reducing the number of optical components needed for controlling many signals. For example, the individual bits of a complete frequency-multiplexed word can be gated on and off, individually or as a group, by controlling the input signals to a single device."

OBJECTS OF THE INVENTION

One of the objects of this invention is to provide the means and method of pattern-recognition computing, logic, and signal processing.

A further object of this invention is to provide a method of calculating energy distributions within dynamic images, and producing coordinated, optimized optics for the implementation of pattern-recognition computing.

The foregoing objects and benefits of the present invention will become clearer through an examination of the drawings, description of the drawings, description of the preferred embodiment, and claims which follow.

BRIEF DESCRIPTION OF THE DRAWINGS

FIG. 1 is an operational drawing showing modulated patterns with a double image component separator.

Figure 1A:
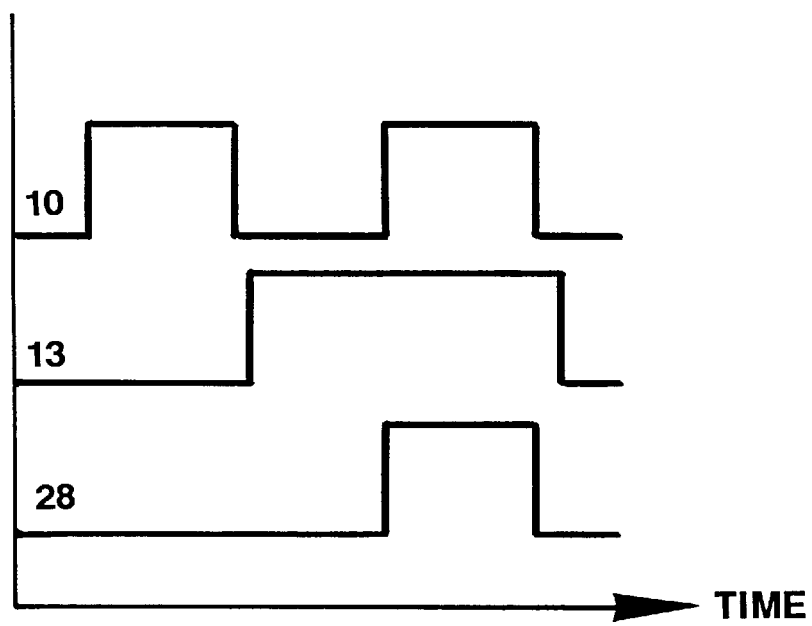
FIG. 1A illustrates the relationship between input and output waveforms of the present invention.

Please note that the beam angles, sizes, and proportions are exaggerated so as to provide for clarity of understanding.

DESCRIPTION OF THE PREFERRED EMBODIMENT

FIG. 1 illustrates a basic embodiment of the present invention having four inputs (10) through (13), each modulated independently with quantized information. They may be binary, or may have any number of discrete modulation levels representing the information to be computed. Each input is provided with an optical element array that causes energy from each input to take on a pattern. Any array of optical elements, be they lenses, prisms, holograms, or the simple masks shown in FIG. 1, can be used to impress the patterns onto the modulated input energy. These optical elements also act as a combining means for producing dynamic image (31) from which output (28) is taken, and dynamic image (31A) from which output (29) is taken.

In this example, energy from input (10) takes on pattern (14), here shown as a star, to produce a wavefront (18) that includes both the star pattern and the information modulated onto input (10). Input (11) is directed to pattern (15), here shown as a diamond, to produce the modulated wavefront (19). Input (12) produces modulated wavefront (20) having the circular pattern from pattern (17). Input (13) produces modulated wavefront (21) having a random pixel pattern from pattern (16).

Wavefronts (18) through (21) combine to form (a) dynamic image(s) located at image component separator(s) (22) and/or (25). The image component separators can be arrays of optical elements and may include lenses, prisms, holograms, or the simple masks shown in FIG. 1. Portions of the energy from dynamic image at position (24) are passed through image component separator (22) into output (28), while other portions are stopped as at position (23). Likewise, still other portions of dynamic image at position (27) pass through image component separator (25) to become output (29), while the portions at position (26) are blocked.

FIG. 1A shows a computing relationship between a set of input waveforms and an output waveform. The computing relationship in this diagram is the logical AND function shown over time. Inputs (10) and (13) are the modulated waveforms over time. At least one output (28) is the logical AND of inputs (10) and (13). In this particular situation, inputs (11) and (12) are off (not used), and output (29) is not being considered. This is the case when the energy at position (24) obeys the tenets of special interference.

Figure 2A:
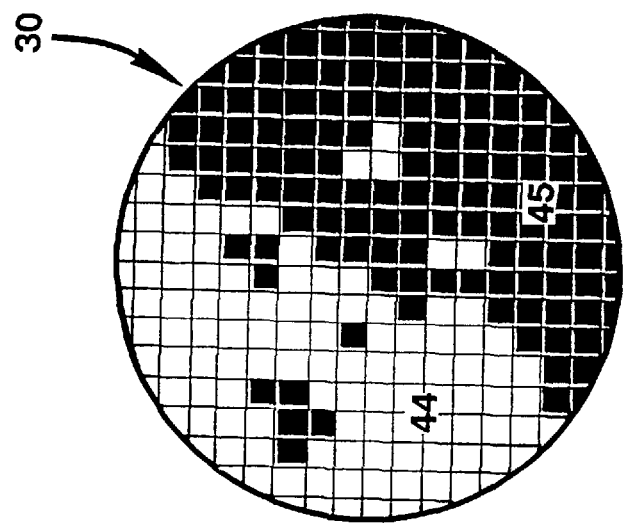
FIG. 2A is an expanded view showing area 30 of FIG. 2.
Figure 2:
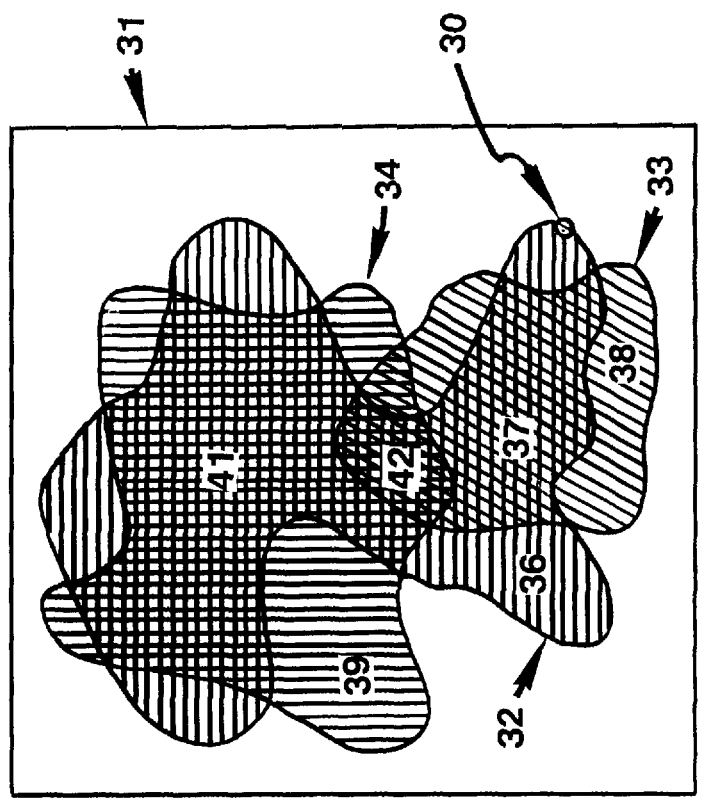
FIG. 2 shows a dynamic image set from a two-pattern input.

The method of determining which portions of the dynamic image are to pass into an output and which portions are not is a major feature of the present invention. FIG. 2 shows how such a determination is made.

The area where the dynamic image (31) appears is in within the area of separator (22). In this illustration, only inputs (10) and (13) producing one output (28) of FIG. 1 are used because the number of modulation combinations increases rapidly and becomes difficult to draw as one increases the number of inputs and the number of quantized modulation states. Because binary inputs are contemplated, for purposes of this discussion, there are two states in each set of modulation states for each input, as in FIG. 1A.

When inputs (10) and (13) are both off, there is no light, and hence no dynamic image. For that reason, that state combination is not shown in FIG. 2, even though it is a valid input combination.

When input (10) is on and input (13) is off, wavefront (18) forms a first dynamic image state shown as diagonal cross-hatch area (33) within dynamic image (31), which is one of the set of images that make up dynamic image (31). At this time, only this portion of (31) has energy from input (10) because the laws of physics determine how wavefront (18) is affected by pattern (14).

When input (10) is off and input (13) is on, wavefront (21) forms a second dynamic image state, shown as vertical cross-hatch area (34). Again, only this portion of (31) has energy from input (13) because the laws of physics determine how wavefront (21) is affected by pattern (16).

When inputs (10) and (13) are both on, pattern-modified wavefronts (18) and (21) combine and interfere to direct energy into area (32), shown as horizontal cross-hatch, to form a third dynamic image state.

As the inputs go through the various combinations of modulation states, the energy distribution within dynamic image (31) will change from one interference image to another. But, because the patterned inputs and the image component separator are stationary, the set of images that make up the dynamic image remain the same. That is, each combination of input modulation states will produce one and only one interference image. While a different combination of input states will produce a different interference image, the image produced for that combination will always be the same whenever that input combination is present at the input.

In order to produce logic and other computer functions, energy is separated from dynamic image (31) from locations that correspond to the functions to be performed. For example, if the logic function to be performed is the logical OR, the output is separated from area (42) and contains energy during each of the three state combinations as indicated by the overlapping of all three areas (36), (38) and (39). The area of the image component separator (22) that corresponds to area (42) in the dynamic image is made clear so energy from area (42) can go into output (28), while the rest of (22) is made opaque to prevent energy of other combinations from adversely affecting output (28).

If the function to be performed is to provide energy to output (28) when input (10) is on or when inputs (10) and (13) are on, but not when input (13) is on by itself, the energy from overlapping area (37) is separated into output (28). If the AND function is to be used, energy is separated from area (36). Since area (36) contains energy only when inputs (10) and (13) are both on, this area also conforms to the tenets of special interference, so that such a device can be used to accomplish all of the tasks performed by other special interference devices.

Each individual interference image that corresponds to a particular combination of input states is generally much more complex than those shown here, having differing amplitude values and phases from one part of the image to another. In order to utilize such complex images, the present invention uses an image component separator that is made of an array of optical elements. An expanded view of a portion of that array is shown as FIG. 2A, which is an enlarged view of area (30).

This expanded view shows the image component separator made of an array of pixel-sized optical elements, in this case clear pixels (44) or opaque pixels (45). The optimum size of the pixels depends upon the nature of the dynamic image. The pixel-sized areas can be as large as a full optical that is positioned within one of the component parts of the dynamic image, such as areas (36), (39) or some other area(s), or the pixels can be much smaller and more suitable for computing the coordinated optics set.

Energy passing through each of the pixels of the separator combines to form a single output (28). However, the distribution of energy in each of the pixels may or may not have energy which represents a waveform that is conducive to producing the combined output waveform desired in output (28), one which properly represents the logic or other computation to be accomplished by the completed device. This includes the separation of phase-varying energy to form phase modulated outputs. Hence, those pixels (45) which will not contribute to the desired output waveform in a positive fashion are made opaque, while those that will are made as clear openings or some other transparent optical element (44).

Figure 3:
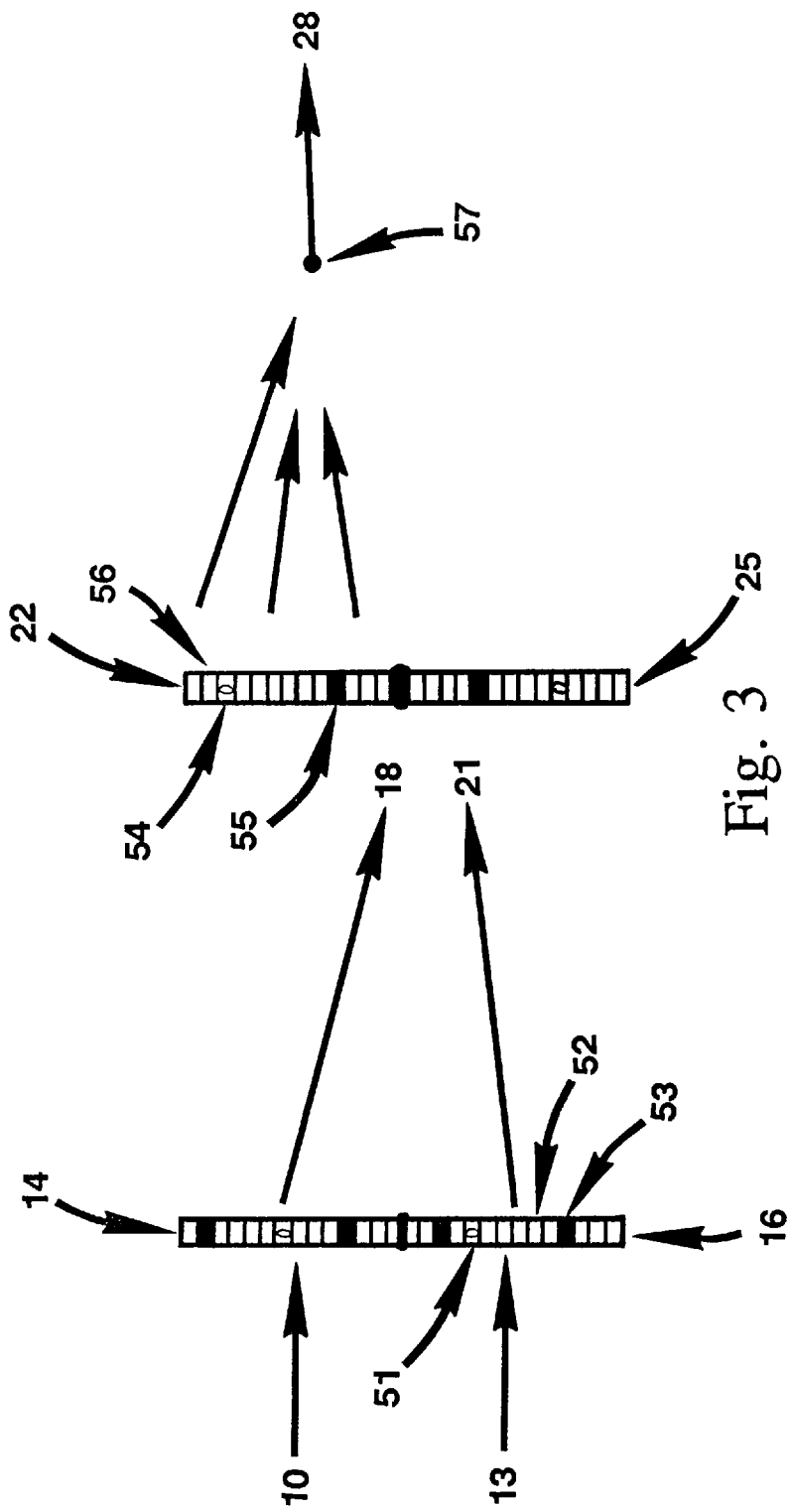
FIG. 3 illustrates image component separation with secondary recombining in the present invention.

FIG. 3 shows a cross-sectional view of patterns (14) and (16) and image component separators (22) and (25) taken along lines 3—3 of FIG. 1. Energy from patterns (14) and (16) is directed toward image component separator (22) where the dynamic image is formed on the left side of image component separator (22). The dynamic image components are separated by strategically placed optical elements that make up the array of optical elements that accomplishes energy separation. The individual optical elements in the array can be filters, lenses, holograms, phase changers, opaque areas, or any other optical element or portion thereof. Some examples are shown as a lens (54), an opaque area (55), and a transparent area (56).

Output from the array of optical elements that make up the image component separator (22) is directed to a common output location (57) to form the combined output (28).

Each element in image component separator (22) is chosen, positioned, and oriented so as to provide a positive contribution to output (28) in forming a desired waveform as the input sequences through its various combinations. If the energy at a certain position such as opaque area (55) cannot be modified by any practical optical element to provide a positive contribution to output (28), that position is made opaque.

Patterns (14) and (16) are used to modify the input energy of inputs (10) and (13) respectively so as to provide an individual pattern arrangement to the modulated wavefronts (18) and (21). As with image component separator (22) and/or (25), patterns (14), (15), (16) and/or (17) can be made of arrays of various optical elements such as a lens (51), a transparent area (or opening) (52), and/or an opaque area (53). As is the case with image component separator (22) and/or (25), these elements can be pixel-sized elements of any type.

By properly selecting the optical elements in these arrays, the wavefronts can be "tuned" or modified so as to provide an optimal dynamic image that can be used to produce better image component separators (22) and/or (25) and better waveforms at output (28).

Pixel-sized optical elements for image component separator (22) and patterns (14) and (16) are especially useful when using the procedure of calculating the various optical elements and optimizing those calculations as taught herein.

For purposes of calculating, the pixels are made small enough so that energy components during each of the possible input state combinations can be easily represented in a mathematical model. One such way is by using an amplitude vector, wherein the angle of the vector represents the phase of energy at that pixel. However, there are other ways to represent wave energy that can also be used.

Figure 4:
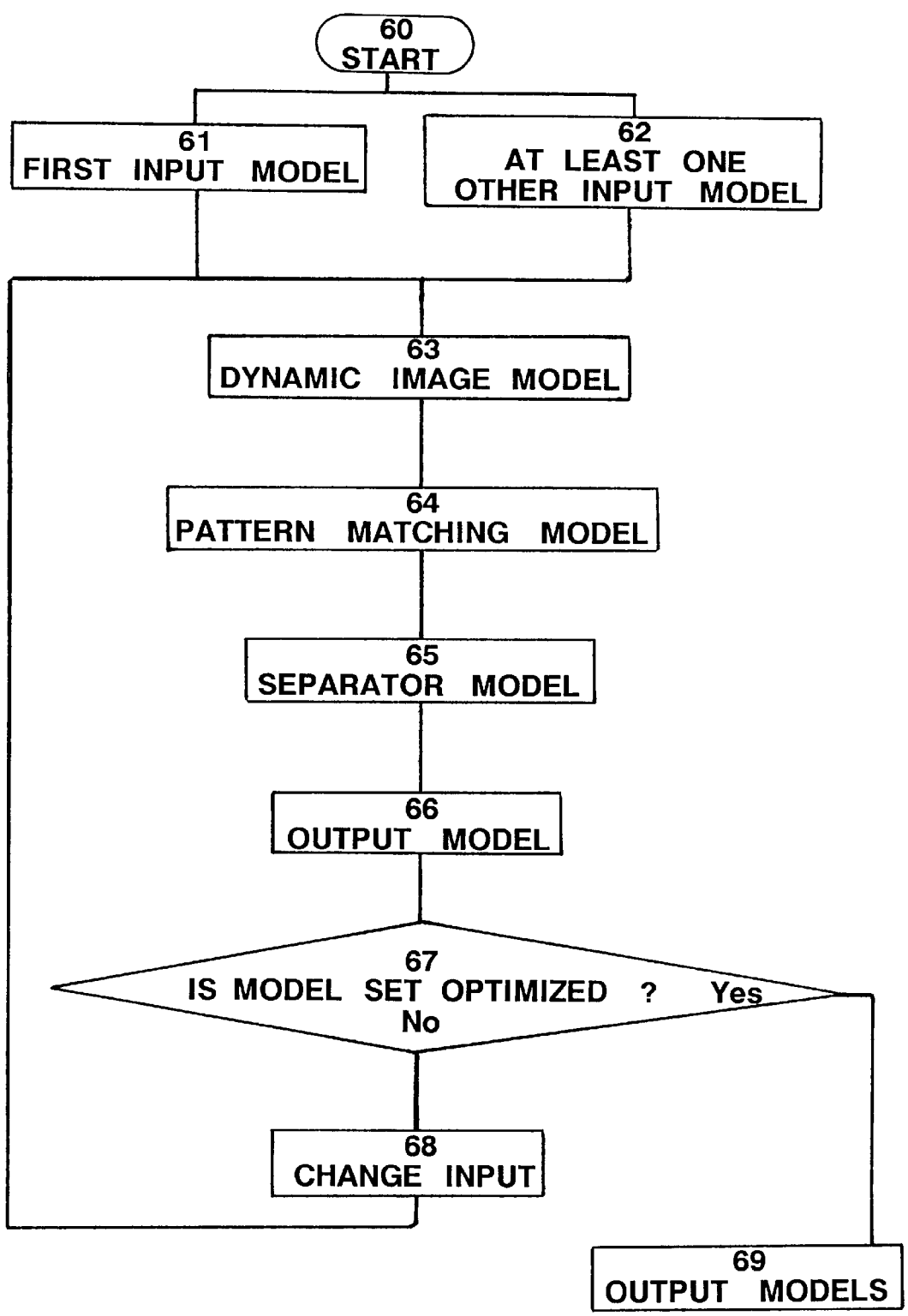
FIG. 4 is a flow chart showing a method of calculating optimized coordinated optics.

FIG. 4 depicts the flow chart for the method of calculating the pattern-recognition computing components of the present invention. Compare FIGS. 1, 2, 3 and 4. The basic procedure starts (60) by producing a first input model (61) which describes a first modulated wavefront (18) modulated with quantized information having a first set of modulation states.

Also, at least one other input model (62) is produced describing at least one other modulated wavefront (21) modulated with quantized information having at least one other set of modulation states. The production of input models (61) and (62) is shown occurring in parallel because they do not have to be produced in any particular sequence with respect to each other. However, the production of dynamic image model (63) requires both input models (61) and (62).

Dynamic image model (63) therefore describes images occurring at areas (36) through (39), (41) and (42) of at least one dynamic image (31) using the first input model (61) and at least one other input model (62) and calculating input state pattern combinations from the first set of modulation states and at least one other set of modulation states as the first input wavefront (18) is combined with at least one other wavefront (21).

At this point, the procedure of the present invention has accomplished what prior procedures have not: the production of a description of the component parts of a dynamic image for each of the quantized information states presented at the input for use in pattern recognition computing. From this, a description of the image component waveforms that result from any series of input combinations can be deduced.

The next step uses the dynamic image model (63) to produce a pattern-matching model (64) by selecting from the dynamic image model (63) image component subsets that can be used to provide helpful contributions to output (28). The additional information needed to produce pattern-matching model (64) is a truth table, rules of logic, or other description of the waveform that is to be produced at output (28) given the sequence of input modulation states that are to be used in the completed device.

Once a description of helpful output locations within the adjacent dynamic image is acquired, the next two steps are to create a separator model (65) and an output model (66). These two steps are produced together. Each pixel in pattern-matching model (64) corresponds with a pixel element in image component separator (22) and the separator model (65). The information at each pixel from dynamic image model (63) and pattern-matching model (65) for each of the input modulation states is used to determine which optical element is to be placed at each pixel in order to provide energy which will be helpful in the construction of the desired waveform at output (28).

Taking the energy contributions from each pixel element of image component separator (22) as they appear at location (57) of output (28) produces a description of the output waveform which is output model (66).

At this point, the present invention has accomplished what no other calculation process has done before: it has produced a description of the output waveform that results from separating a dynamic image produced from multiple modulated patterns. The optical elements that make up the separator have been designed by this process so that they are coordinated with the modulated-input wavefronts, thus producing "coordinated optics."

Having calculated a set of coordinated optics for producing a logic or other computational function, there is still room for improvement. The patterns chosen at the beginning as parts of the input models (61) and (62) may not be the most effective patterns for producing the desired waveforms at output (28), as may some other pattern or set of patterns modulated with the same quantized information. To determine whether a different pattern would be better, the next step is first to determine if the patterns currently described in the input models (61) and (62) are already the optimal patterns. Such a determination can be made on the basis of a number of criteria used to compare to the output model (66) and/or the separator model (65). If the model set is already optimized, the models are output (69) from the process where they can be used to manufacture the working components of the present invention.

If the coordinated optics are not yet optimized, one or more of the input models (61) and/or (62) are changed (68), and another set of coordinated optics is calculated, restarting this iteration at the production of a new dynamic image model (63).

Again, a determination is made at (67) to see if the models have been optimized, but from now on, a comparison can be made between the newly calculated separator and output models and those produced by previous iterations. If the optimal models have not yet been found, the iterations continue until the best arrangement is found, even if that requires the calculation of all possible arrangements.

When the optimal set of coordinated optics as described in the models has been calculated, output (69) provides these calculated results. At this point, the present invention has produced what no other calculating process has produced: a description of an optimal coordinated set of optics capable of producing computer functions by recognition of multiple modulated patterns.

Figure 5:
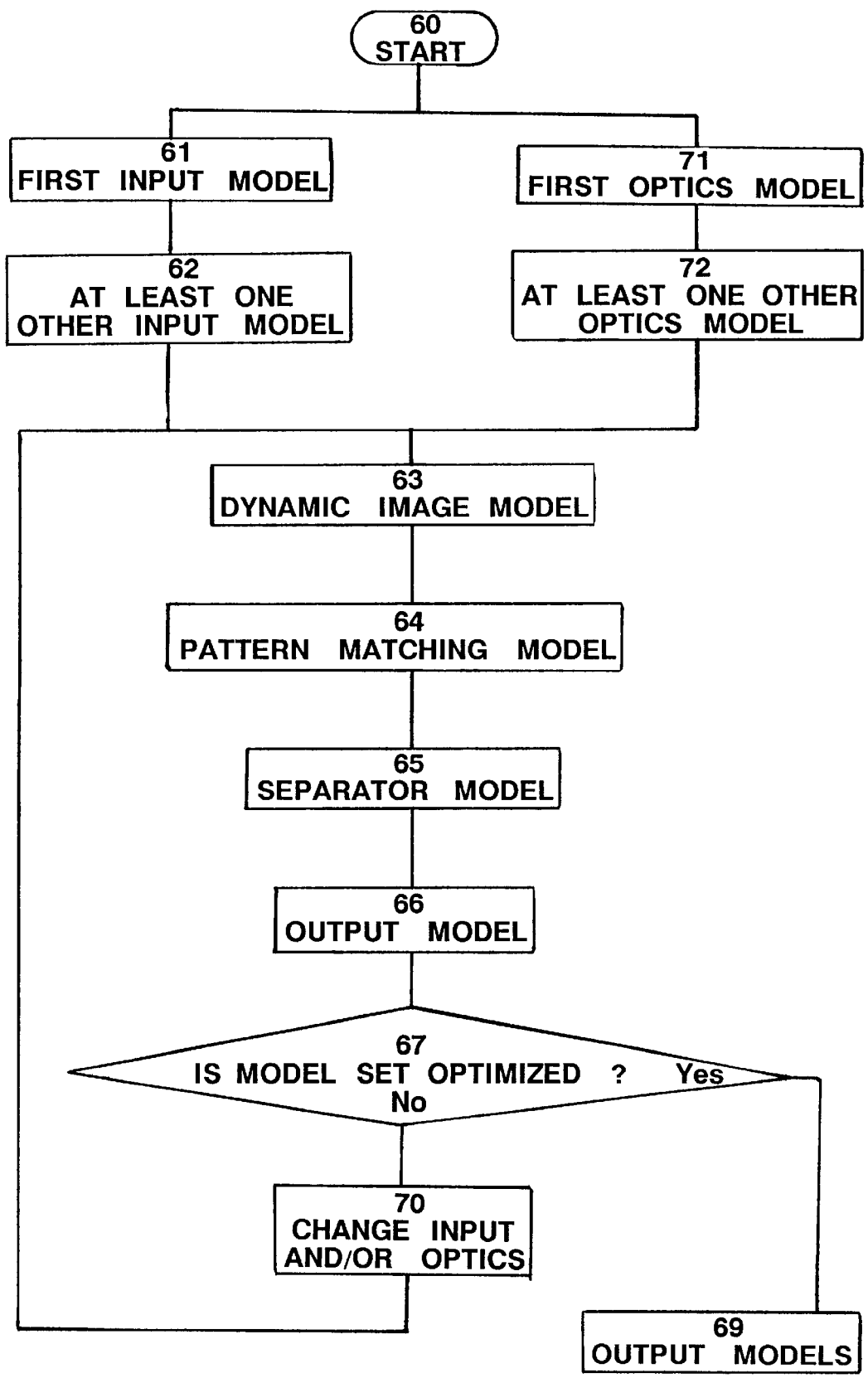
FIG. 5 is a flow chart showing a method of calculating optimized coordinated optics including input arrays of optical elements.

FIG. 5 shows an improvement over FIG. 4: the addition of an array of optical elements for adjusting the energy in patterns (14) and (16) of FIG. 3. These arrays are described as a first optics model (71) and at least one other optics model (72). In FIG. 5, the production of the optics models is shown in parallel with the production of the input models because the optics models can be produced without necessarily using information from the input models. However, they can also be produced using information from the input models, and can even contain information about the patterns.

The important point is that the input models (61) and (62) and the optics models together describe the modulated wavefronts (18) and (21) of FIG. 3. As a result, all the information needed to describe these wavefronts must be included in the input and optics models before the dynamic image model (63) can be calculated.

The next difference between FIGS. 5 and 4 is at (70), where changes are made in the input models and/or the optics models in order to continue the iterative process for optimizing the arrangement. The addition of the optics models allows for a greater variety of possible changes to the modulated wavefronts (18) and (21) over simply changing the patterns themselves. This greater variety of possible wavefronts results in a greater opportunity for producing a better set of coordinated optics for accomplishing pattern-recognition computing. The coordinated optics now includes the arrays of optics at patterns (14) and (15) as described by the optics models (71) and (72).

Again, the present invention has accomplished what none other before it has. It provides a method of accomplishing pattern-recognition computing along with a method of producing a coordinated and optimized set of mathematical descriptions for producing the actual optics used in pattern-recognition computing.

The present invention has the additional advantage of providing a method of producing a much larger variety of output waveforms, making it capable of accomplishing a much wider variety of computational tasks beyond simple Boolean logic. Even with a large number of inputs with a large set of possible modulation states, the present invention continues to provide both a determination of how to build devices and the functioning devices themselves, which are able to provide a modulated pattern-recognition computing equivalent of the table look-up function of a read-only memory having multiple inputs and multiple outputs as in FIG. 1. Any type of information that can be quantized into the mathematical models can now be produced for optical retrieval from a coordinated optics set.

Optical element arrays having a large number of pixel-sized optics of the present invention can now be used for the storage of large amounts of information within the precalculated arrangements of the coordinated optics. By directing the outputs from an optical register set into the inputs of the present invention, every possible arrangement of registers can be calculated to produce any desired set of output waveforms that correspond to the parallel processing of data stored in those registers. By interconnecting various embodiments of the present invention, entire optical computers can be constructed.

The importance of interference-based computing should not be overlooked as the basis for the present invention. Every type of interference, including special interference, can be used in the production of dynamic images. As a result, the present invention is capable of using all of the former interference-based computing processes in a more advanced, more complex, and optimized manner.

Because interference images of different wavelengths can exist simultaneously within the dynamic images, the present invention can be used with advantage because each possible modulation state for each wavelength used forms a part of the quantized information that is described by the various sets of modulation states. The present invention is described as operating at "at least one wavelength," because the present invention is capable of operating using many wavelengths, each with its own modulated quantized information. Multiple-wavelength use of separate information channels is the definition of frequency multiplexing. As a result, the present invention provides what no other computing system or method of manufacture provides, namely frequency-multiplexed, parallel-processed computing based on the recognition of multiple modulated patterns using dynamic interference images, a coordinated set of optimized optics, and the method of producing the same.

While the foregoing description of the preferred embodiment of the present invention has disclosed specific constructions, means, and methods of accomplishing the present invention, because specific improvements and modifications will become readily apparent to those skilled in the art of computers and optical devices and the like, it is applicant's intent not to be limited by any of the foregoing descriptions, but only by the claims which follow.

What is claimed is:

1. A method of pattern-recognition computing using wave-type energy comprising the following steps:

producing a first input wavefront of at least one wavelength having a first pattern modulated with first quantized information resulting in a first set of modulation states;

producing at least one other input wavefront of said at least one wavelength having at least one other pattern modulated with other quantized information resulting in at least one other set of modulation states, said at least one other set of modulation states having a computing relationship with said first set of modulation states;

combining said first input wavefront and said at least one other input wavefront to produce at least one dynamic image having a set of patterns having component parts, and separating energy from a subset of said component parts that constitutes a computational result to produce at least one output, thereby providing a method of pattern-recognition computing.

2. The invention of claim 1 wherein:

said at least one wavelength includes a plurality of wavelengths, each of said plurality of wavelengths being independently modulated with quantized information having independent said computing function relationships, thereby providing a method of frequency-multiplexed pattern-recognition computing.

3. The invention of claim 1 including:

separating energy which varies in phase whenever said computational result produces energy within said subset of said component parts which varies in phase, thereby providing said at least one output having phase-modulated energy.

4. The invention of claim 1 including:

separating energy resulting from special interference from said subset of said component parts.

5. A pattern-recognition computer comprising:

a first input for inputting a first input wavefront of at least one wavelength having a first pattern modulated with first quantized information resulting in a first set of modulation states;

at least one other input for inputting at least one other input wavefront of said at least one wavelength having at least one other pattern modulated with other quantized information resulting in at least one other set of modulation states, said at least one other set of modulation states having a computing relationship with said first set of modulation states;

combining means for combining said first input wavefront and said at least one other input wavefront to produce at least one dynamic image having a set of patterns having component parts, and separating means for separating energy from a subset of said component parts, said energy constituting a computational result providing at least one output, thereby providing a pattern-recognition computer.

6. The invention of claim 5 wherein:

said at least one wavelength includes a plurality of wavelengths, each of said plurality of wavelengths being independently modulated with quantized information having independent said computing function relationships, thereby providing a frequency-multiplexed pattern-recognition computer.

7. The invention of claim 5 wherein:

said separating means separates energy which varies in phase whenever said computational result produces energy within said subset of said component parts which varies in phase;

thereby providing said at least one output having phase-modulated energy.

8. The invention of claim 5 wherein:

said separating means separates energy resulting from special interference within said subset of said component parts, thereby providing a pattern-recognition computer that uses special interference.

* * * * *